July 18, 1939.    H. A. KEHL    2,166,687
COMBINATION WRIST WATCH
Original Filed April 7, 1934    2 Sheets-Sheet 1
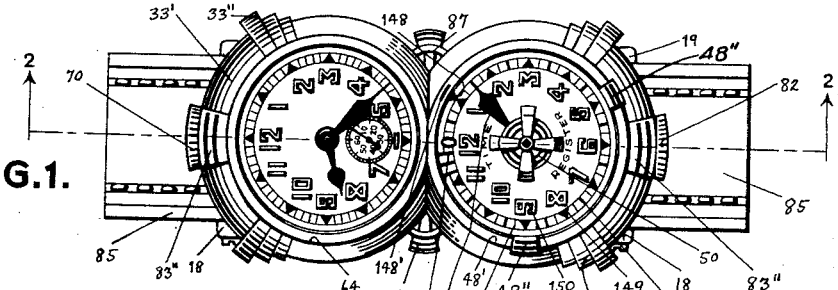
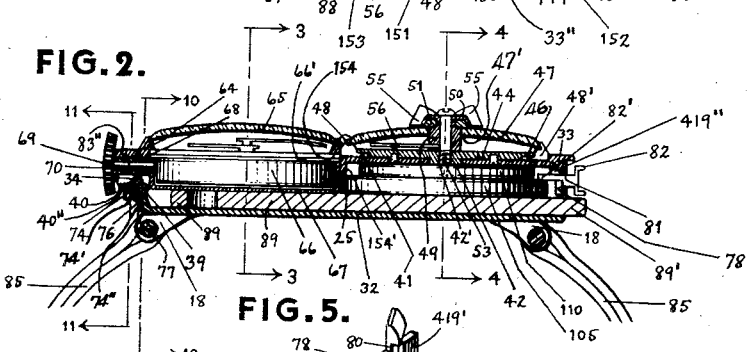
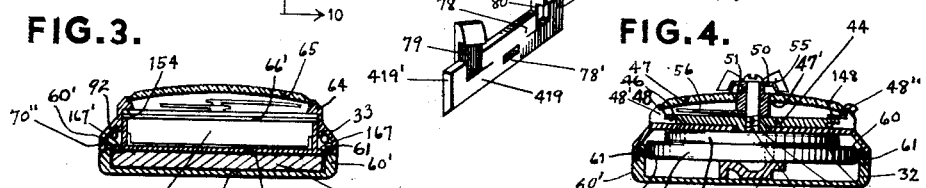
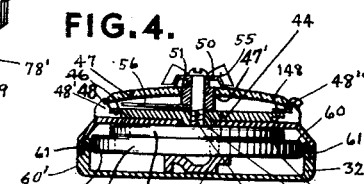
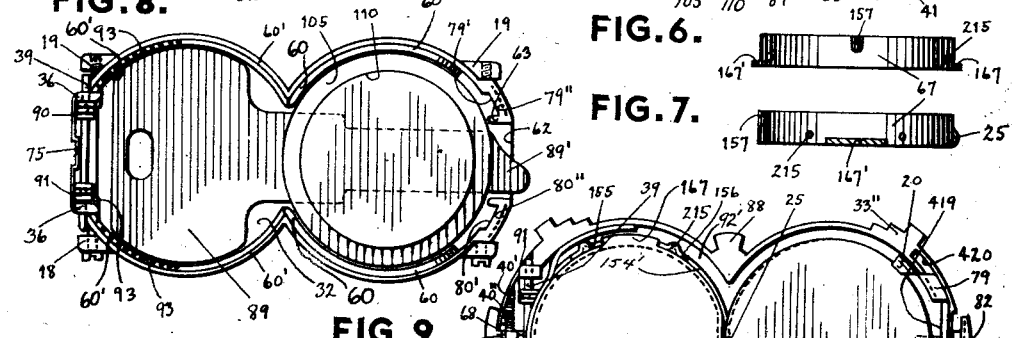
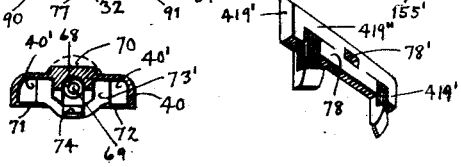
*Howard A. Kehl*
INVENTOR July 18, 1939. H. A. KEHL 2,166,687
COMBINATION WRIST WATCH
Original Filed April 7, 1934 2 Sheets-Sheet 2
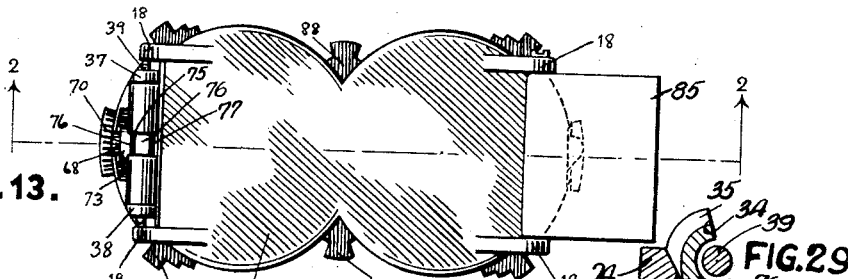
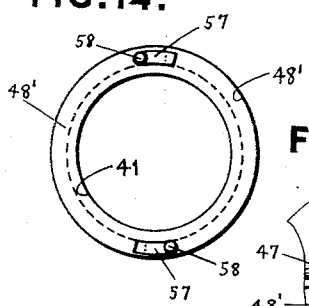
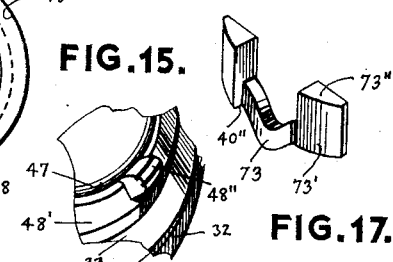
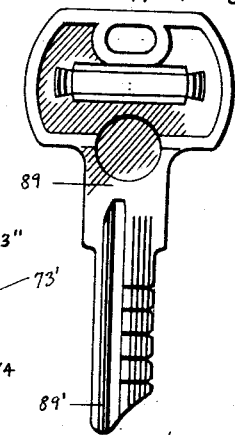
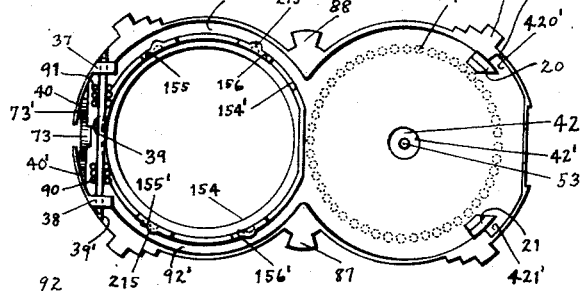
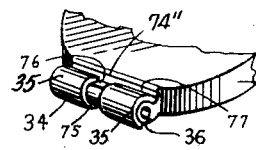
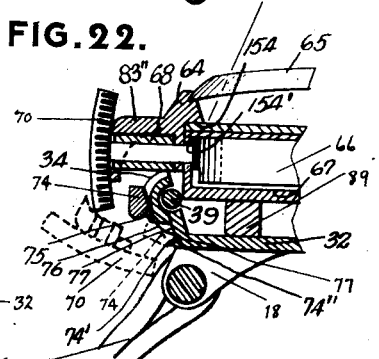
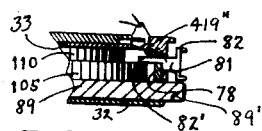
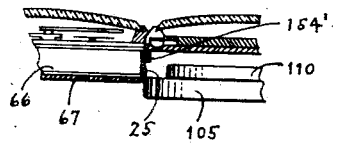
Howard A. Kehl
INVENTOR Patented July 18, 1939

2,166,687

UNITED STATES PATENT OFFICE 2,166,687

COMBINATION WRIST WATCH

Howard A. Kehl, Detroit, Mich.

Application April 7, 1934, Serial No. 719,442
Renewed December 8, 1938

7 Claims. (Cl. 58—88)

This application forms a continuation in part of application, Serial Number 421,618, filed January 18, 1930, application, Serial Number 441,305, filed April 3, 1930, now Patent No. 1,980,207, dated November 13, 1934, and also forms in part a continuation of application, Serial No. 449,192, filed December 1, 1930, now Patent No. 1,954,249 dated April 10, 1934 and relates to new and useful improvements in a combination wrist watch adapted for mounting on the wrist by means of a watch bracelet or strap encircling same, or in the same manner to be worn as all other types of wrist watches which employ strap and lug attachments. Certain parts of the subject matter of this application will be found in application, Serial No. 499,192 which has issued in Patent No. 1,954,249, dated April 10, 1934 and also in application, Serial No. 421,618 and application, Serial No. 441,305 which has now issued in Patent No. 1,980,207, dated November 13, 1934.

Another object of the invention is the provision of a combination wrist watch adapted to hold one nickel and one dime carried for emergency purposes, such as street-car, subway or bus fares, telephone calls, newspapers, tipping and the like; there being provided a coin-guide flange suitable for handy deposit of coins, which are instantly procurable from said coin-guide flange independently; and also a condensed structure whereby a key, although hidden from view, can be flipped upwardly by the thumb in a smart manner and instantly removed for use independently of the coins, and likewise replaced, and thus affording a novel time-saving method for extremely quick use and definite disposal of a key in order to save bother and annoyance when being in a hurry, particularly an automobile or car key of the code-marked type, which type of auto key is singularly adapted for use by the key feature of this invention; since said code-marked type of auto key utilizes a simple kit of inexpensive tools which are substituted for the usual key cutting machine, while at the same time involving the use of only five or six master key blanks covering all makes of automobiles, and thus affording jewelers a cheap and practical method to service the auto key feature at the time the combination wrist watch is purchased retail.

Another object of the invention is the provision of an auto key feature made practical by two new developments in the automotive industry, viz., the complete change to the single operating key for both ignition switch and door and the successful adaptation and general adoption of the new code-marked key for automobile use.

Another object of the invention is the provision of a combination wrist watch having an ingeniously arranged and compact structure, wherein a standard wrist watch movement of a predetermined size which is large enough to be durable and serviceable for a man's model, an accurate-to-the-minute time register which is faultless, scientific and practical both in principle and working operation, golf score register which is designed to supplement the usual score card for recording temporarily the "strokes" of two players for a given "hole" preparatory to score card marking for said "hole", a slightly shortened auto key with standard code-marked shank, and a nickel and dime or two dimes are contained; said structure being without objectionable bulk, height and length, and attached to the wrist by straps of standard widths now manufactured; and being in keeping with those elements, hereinafter described, which combine to make a high-class and durable wrist watch.

Another object of the invention is the provision of both a man's and a women's automobile strap watch adapted for business, touring, sports, social and general wear, having a plurality of practical features built around a durable round wrist watch movement of an 8¾ ligne Swiss or 10/0 American size, simple in mechanism and manipulation, sufficiently economical to manufacture, comfortable to wear on the wrist by the employment of a specially designed case in conjunction with standard-type lugs used with leather straps or metal watch bracelets, and having unobstructed removal for both auto key and coins separately by means of an efficient double-action press-button; said woman's model having an ornamental design, or series of different designs, expressly adapted to feminine tastes, and which also applies to the man's model.

Another object of the invention is the provision of a combination wrist watch case adapted for mounting therein a round wrist watch movement separately in an upper-structure or section and entirely independent of a lower-structure or section hingedly mounted thereunto, and mounting the round wrist watch movement in a wholly protected and dust-proof manner in keeping with sound principles of wrist watch construction, which will hereinafter be explained; the round movement having its block trimmed at one point of its curved side surface only, the movement with said trimmed portion mounted in a specially press-fitted movement casing in order to shorten the over-all length of the case as a whole; said movement casing having at one point a small resilient area for engaging and holding a nickel in elevated position, which is effected automatically when the case is manually forced to closed position.

Another object of the invention is the provision of a combination wrist watch embodying a case of such general shape and structure as lends itself surprisingly to the reduction of bulk to a minimum, which means will hereinafter be described, while also providing a basic structure and form which permits the use of unusual designs of modernistic style, and yet at the same time provides space for the reception of the three loose articles previously mentioned.

Another object of the invention is the provision of an upper-structure provided with two dial-rings for the reception of separate and differently arranged clock faces, the time register dial-ring being projected into an undercut portion of the watch dial-ring at one point for the purpose of lessening the total over-all length of the case; this being employed in conjunction with a specially mounted movement casing which encloses a wrist watch movement with its block trimmed to fit same; and also a latch-plate and latch-spring combined; all of which elements are employed for condensation of structure and to shorten the length of the case to a minimum.

Another object of the invention is the provision of a combination wrist watch having a pair of swingably mounted sections, and provided with means for securely latching the sections together in closed position by employment of double and balanced latching, and with condensed and resilient means for efficiently moving the closed sections to open position upon release of the latch mechanism, said resilient means being concealed from view at all times, and whereby the swingably connected sections, when opening or closing, remain in efficiently secure and rigid alignment.

Another object of the invention is the provision of a structure embodying a pair of hingedly connected sections so arranged that an excessive opening of the sections may be prevented, and thus injury or damage to the hinged sections be entirely prevented.

Another object of the invention is the provision of a combination wrist watch having an upper section or structure which, upon release by the press-button, will open to a predetermined extent or angle on its axis, and be thereat retarded by a hidden cushion-spring which prevents all shock or injury to the hinged connections, movement, upper-structure, watch strap or bracelet, or device as a whole, and whereby the resultant rebound is stopped immediately at the proper angle, the upper-structure fixedly held in position, and undue swinging, oscillation or other movement of the upper-structure on its axis is prevented; and an efficient disengagement of the cushion-spring is effected automatically, when the upper-structure is forced to closed position by fore-finger pressure against the exterior turning-knob or elevated shield adjacent to the press-button; all of which mechanism, although very simple, is provided with strongly re-inforced mountings to insure durability and avoidance of repairs as far as possible.

Another object of the invention is the provision of a structure employing an opening spring provided with double coils and spring-arms in order to secure maximum force with spring wire of a minimum diameter; and whereby the engaging arms of the opening spring may be hidden from view and securely and effectively engaged in position for operation, the engaging arms of the lower-structure retaining the double spring-coils in alignment, in order to allow easy access to the wrist watch movement for repairs or replacement of parts coupled with speedy and handy subsequent re-assembly of the upper and lower sections.

An object of the present invention is the provision in a wrist watch of a casing having a pair of sections hingedly connected together and so arranged that they will serve the purpose of carrying a number of various objects.

Another object of the invention is the provision in a wrist watch of a casing so arranged and constructed that it may be easily and quickly opened and closed.

Another object of the invention is the provision of a wrist watch having an upper and a lower section, these sections being guided in their movement to closed position.

Another object of the invention is the provision of a construction which will provide a durable device and, at the same time, restrict the device to a minimum weight.

Other objects will appear hereinafter.

The invention consists in the combination and arrangement of parts hereinafter described and claimed.

The invention will be best understood by reference to the accompanying drawings which form a part of this specification, and in which, Fig. 1 is a top plan view of the invention.

Fig. 2 is a sectional view taken on line 2—2 of Fig. 1.

Fig. 3 is a sectional view taken on line 3—3 of Fig. 2.

Fig. 4 is a sectional view taken on line 4—4 of Fig. 2.

Fig. 5 is a perspective view of the combined latch and latch-spring used in the invention.

Fig. 6 is a side elevational view of the enclosing movement casing used in the invention.

Fig. 7 is another side elevational view of the enclosing movement casing used in the invention.

Fig. 8 is a top plan view of the bottom section.

Fig. 9 is a bottom plan view of the top section showing the watch movement supporting case and a nickel coin in position.

Fig. 10 is a sectional view taken on line 10—10 of Fig. 2.

Fig. 11 is a sectional view taken on line 11—11 of Fig. 2.

Fig. 12 is a perspective view of a modified form of combined latch and latch-spring.

Fig. 13 is a bottom plan view of the invention, having the strap on the left side removed in order to show the knuckle-shield mechanism.

Fig. 14 is a bottom plan view of the registering-ring or dial-ring, featuring automatic alignment, used in the invention.

Fig. 15 is a fragmentary top perspective view of a portion of the case showing the design and position of one of the two gripping-lugs, relatively to the time register dial-ring and crystal.

Fig. 16 is a perspective view of a retarding spring or cushion-spring used in the invention.

Fig. 17 is another perspective view of the retarding spring or cushion-spring used in the invention.

Fig. 18 is another bottom plan view of the top section, the watch movement supporting case and the dial register supporting plate being omitted.

Fig. 19 is a top plan view of a code-marked auto key master blank used in the invention.

Fig. 20 is a perspective view of an opening spring used in the invention.

Fig. 21 is a bottom fragmentary perspective view of the hinged end of the bottom section, shown without the strap lugs.

Fig. 22 is an enlarged fragmentary sectional view taken on line 2—2 of Figs. 1 and 13, showing the operation of the knuckle-shield mechanism.

Fig. 23 is a fragmentary sectional view of the double-action press-button and latch mechanism used in the invention, herein showing their relative position when the case is in normally closed and locked position.

Fig. 24 is another fragmentary sectional view of the double-action press-button and latch mechanism used in the invention, herein showing their relative position when the press-button is operated for unobstructed removal of the auto key only.

Fig. 25 is another fragmentary sectional view of the double-action press-button and latch mechanism used in the invention, herein showing their relative position when the press-button is being operated for independent removal of the coins from the coin-guide flange of the bottom section.

Fig. 26 is a fragmentary sectional view of the top section, taken on line 2—2 of Fig. 1, showing coins being wedged into locked position, while closing the case, relatively to the movement casing.

Fig. 27 is a fragmentary sectional view showing the coins wedged into locked position in the top section, relatively to the two wedging members used in the invention.

Fig. 28 is a fragmentary, perspective view of the invention.

Fig. 29 is an enlarged sectional view through the pivotal mounting of the invention.

The structure embodies a casing having a lower section 32 and an upper section 33, which are hingedly connected together at one end. A semi-cylindrical-like member 34 on the lower section forms a knuckle-shield, which has the curved portion 35 extending partially around the side walls of knuckle-forming portions 36. By extending partially around the side walls of 36, the curved portion 35 permits entry to the knuckle-shield 34 of the spring-coils 90 and 91, when the sections are assembled together. The knuckle-forming portions are formed integrally with the casing members and two of them, 37 and 38, are on the top section as shown in Fig. 13, and two others, both indicated by the numeral 36, are on the bottom section, as shown in Fig. 8. The shield member 34 is separate from but fastened to the knuckles in any desired manner and is composed of two end portions 35 between which there is a specially shaped grooves 75, 76 formed by a cutting away of the mid portion of shield member 34, as shown in Fig. 28. This shield member 34 serves to hide the spring coils 90 and 91 and also to cooperate with the spring 73 described hereinafter. These knuckle-forming portions 36 are adapted to align with the downwardly directed knuckle-forming tongues 37 and 38, which are formed on the casing 40 at one end of the upper section 33. A pintle 39 is projected through the knuckles 36, 37 and 38 to hingedly mount the sections together. This pintle also extends through the spring-coils 90 and 91. Arms 92 project from these coils and are formed from a doubled-over section of the wire from which the opening spring is made. When the sections 32 and 33 are mounted together, the pintle 39 is press-fitted through the grooves 39' which are formed in the casing sections, thus holding the pintle securely without employment of other means in the knuckles 36, 37 and 38. The pintle is wedge-shaped at one end to facilitate its projection through the two spring-coils 90 and 91, whose individual coils remain tightly together while in normal position and also operative action, and the four knuckles. The arms 92 of the opening spring are adapted to engage the upper section 33, which is provided with a cut-away portion 92' to form a circular channel for the reception of these arms. The arms 93 engage against the bottom of the lower section 32, so that an efficient and reliable spring is thus provided which normally tends to move the upper and lower sections into open relation. It will be noted that the spring-arms 92 are hidden from view at all times, being tightly positioned in the channels 92'; and the lower spring-arms 93, as shown in Fig. 8, are also concealed from view since they lie snugly against the side walls of the lower section 32, being easily snapped into corresponding undercut grooves formed therein. This construction is shown in Fig. 8 by means of dotted lines, where it will be observed that the knuckles 36 are also undercut inwardly for reception of the lower spring-arms 93. This construction provides ample security for retention of the spring-coils 90 and 91 in rigid alignment, both during original manufacture when the sections are mounted together and during re-assembly following repairs to the movement.

The upper section, outside of the dial-rings 48' and 64, has downwardly-curved end surfaces 33', placed considerably lower than the elevated dial-rings 48' and 64, and terminating on their sides with similarly downwardly-curved, double wing-projections 33''. These ornamental wing-projections 33'' are extensions of the curved end surfaces 33' and identically follow their same downward curvature. For purposes of design three grooves, of whatever width desired, separate the wing-projections individually, both from each other and from the curved end surfaces 33'; these grooves are preferably filled with black enamel or material of another color scheme, in order to conform with whichever colored enamel is employed throughout the design especially relative to all the ornamental grooves throughout the wrist watch case. The short, inside wing-projections of the four separate sets require no such separation by means of grooves since their curved surfaces inwardly provide edges, adjacent to the flat downwardly-inclined surfaces of the upper section 33; however, an ornamental separation line may also here be employed. Any other desired design or designs may be carried out or substituted.

The elevated surfaces 83'' project horizontally above the downwardly-curved end surfaces 33' and serve the purposes, as follows: to house the stem 69 and sleeve 68 of the wrist watch movement 66, and to provide a practical shield 83'' for the crown 70; and, on the other end of the wrist watch case, to provide a shield 83'' for the press-button 82 which the over-hanging edge of the shield protects, to provide together with the press-button 82 concealment for the shank 89' of the auto key 89 when the same is contained in the lower section 32, and to provide an auxiliary surface on the shield 83'' to combine with means hereinafter described for manually pressing the upper section 33 to closed and locked position.

Mounted on the upper section 33 is the guide-ring 41, which is integrally formed with the time register dial-ring 48', and which engages in the cut-away portion 46 of the disc 44. This disc 44 is provided with the central downwardly-offset circular portion 42, which engages in the corresponding opening or circular aperture 42' of the upper section 33. This construction provides exact centering of the disc 44 upon the upper section 33, in conjunction with the rotatable dial-ring 48', during assembly. The disc 44 is fixedly secured in correct position upon the upper section 33 by the employment of two countersunk screws, placed in spaced relation, as shown in Fig. 2; any other more suitable means for fixedly mounting the disc 44 may be substituted. Embracing the disc 44, and rotatably mounted, is the dial-ring 48', projecting outwardly from which are the two gripping-lugs 48''.

The gripping-lugs 48'', as shown in Figs. 1, 2 and 15, are harmoniously shaped and proportioned to conform with the motif of design of the case as a whole; and, as shown in Fig. 15, they have formed on their top curved surfaces ornamental grooves which are also adapted to be filled with black enamel or material of another color for purposes of design. They are only provided an elevation above the top flat edge and slanting surface of the dial-ring 48' sufficient to permit the nail or tip of the fore-finger a sure grip for turning the rotatable dial-ring 48' in either direction; and, for this purpose, their side surfaces are flat and perpendicular. The underneath, slanting surfaces of the gripping-lugs 48'' are so positioned as to have clearance, during rotation of the dial-ring 48', of the stationary watch dial-ring 64, as shown in Fig. 2. The gripping-lugs 48'', along with the registering-plate or triangular marker 148, are positioned equidistant on the dial-ring 48', allowing the triangular marker 148 to be in full view during manual rotation and not obscured from view by the fingers. The gripping-lugs may be formed integral with the dial-ring 48', attached to same by pin projections, or in any other manner which may be decided upon as preferable for manufacture; and, regarding shape and design, they may be altered to harmonize with any modernistic motif of design carried out on the wrist watch case as a whole.

The rotatable dial-ring 48' is provided with a groove or bezel 48, which is common to bezels universally employed for mounting watch crystals of this type. The bezel 48 engages the beveled edge of the crystal or transparent closure 47 which has a central opening 47' formed therein. Engaging in the opening 47' is a hub 49, which rotatably engages the top, outside surface of the disc 44. The dial-ring 48' has an inwardly-tapering side surface between the crystal 47 and the disc 44, or dished inside surface. This allows an improved view of the time register dial, the registering-plate or marker 148 to be positioned midway of its slanting surface, and also permits the marker 148 to be correspondingly larger.

A flange 50 is formed on the outer end of the hub 49, and bulged outwardly or radially cut away adjacent its center to provide a recess for the reception of a yieldable washer 51, made preferably from rubber or other strong and resilient material. The hub 49 is cut slightly inwardly adjacent to the flange 50 to permit the yieldable washer 51 to cover or straddle the circular opening 47', as shown in Fig. 2. This yieldable washer 51 projects slightly beyond the circular recess in flange 50, in which recess said washer is seated.

The projecting portion of the washer engages crystal 47, which crystal is thus protected from direct contact with the flange 50. Thus the turning-knob and its related members as a whole, afford an unquestionably sound and faultless constuction which not only provides protection against dust to the time register dial enclosure but also protects the crystal 47, as a guard or bumper, against breakage from external objects. Besides, the exterior turning-knob admirably serves the vital requirement for provision of suitable means for closing the upper section 33, eliminating all danger of finger pressure being applied to the crystal 47 for said purpose.

A bolt 53, which is threaded at its lower end, is projected through the hub 49 and the disc 44, the latter being threaded for its reception. The bolt 53 is provided with thread large enough to cause a tight fit in disc 44 to prevent frictional loosening caused by rotation of the hub members; or, if otherwise deemed desirable, it may be fixedly secured to the disc 44.

The outer end or head of the bolt 53 is provided with a square pocket or flat-sided recess, as shown in Figs. 1, 2 and 4, into which may be inserted the end of a suitable tool so that a tightening or loosening of the bolt 53 may be effected, and thus handy and quick adjustments may be made from the exterior of the upper-structure and without the time register mechanism being unassembled or dismounted whatsoever, said square-shaped pocket at the same time being in harmony with the ornamental design of the hub 50 and its radially-extending upward projections 55 and in no way detracting from its ornamentation.

These radially-extending upward projections, in the form of wings, serve as finger-grips by which the hub 49 may be manually rotated in a quick and efficient manner with the tips of the fingers. The flange 50, together with the gripping-wings 55, form on the outer end of the hub 49 a turning knob which is of a modernistic and pleasing design, serving at the same time a decorative function in connection with the time register and the combination wrist watch as a whole; and also, along with the outwardly tapering gripping-wings 55, affording a low-swung, unobtrusive and compact structure relative to the outside surface of the crystal 47. The gripping-wings 55, which have flat top surfaces, form together an upper and concave surface designed to permit fore-finger pressure to be exerted against the turning-knob for closing the upper section 33 to locked position. When the finger pressure is thus applied, it is transferred to the disc 44 which entirely withstands all downward pressure exerted on the turning-knob. It will be noted that no lateral warping which might strain or loosen the crystal 47, during rotation, is possible; which prevention is effected by the rigidity of the bolt 53 to the disc 44, holding the inside cylindrical hub 49, which is sufficiently thick in diameter, upright. This rigidity also prevents accidental displacement of the turning-knob after coming to rest at a given point during manual rotation, for the turning-knob is resistant to the extent of requiring real finger pressure to cause its rotation; and the concealed resilient washer 51 rides the surface of the crystal 47, upon which only enough pressure from the resilient washer is exerted to enable the latter to provide due protection against dust to the interior time register enclosure. Hence, in this manner, and because the resilient rubber washer 51 offers very slight resistance, due to its very small frictional area in contact with the surface of the crystal, the dial-ring 48' and attached crystal 47 revolve together by the employment of the ordinary bezel; also the crystal 47, as well as the watch dial crystal 65, may be sealed around their juncture in the dial-rings 48' and 64 with whatever material is now sometimes employed or with whatever material may be found advantageous for this purpose, should it be desired. Due to its top and outside location, the turning-knob, in addition, prevents optical confusion between the two dials when the wearer of the combination wrist watch seeks time.

Secured to, and projecting outwardly from the hub 49, and lying in spaced relation between the disc 44 and the crystal 47, is a hand or pointer 56, conforming in design and general size and shape to the minute-hand of the wrist watch movement 66.

The disc 44 may be termed a dial-disc, as it bears on its outside visible face graduations indicating the hours, half-hours and quarter-hours, and numerals indicating the hours.

Secured on the undersurface of the registering-ring 48', as shown in Fig. 14, at diametrically opposite points at cut-away portions, are spring-strips 57, each of which is provided on its free end with a tapered boss 58; said bosses being selectively engageable in the forty-eight spaced recesses 59, formed on the undersurface of the upper section 63, as the registering-ring 48' is being manually rotated. These are shown in Fig. 18. The engagement of these bosses in the recesses 59 serves to resist rotative movement of the registering-ring 48', and prevent its undue movement or accidental displacement; besides, they provide automatic alignment with each of the forty-eight quarter-hour spaces on the dial, permitting speedy and precise registrations to be made by the wearer because the registering-plate or marker 148 clicks into place automatically at each quarter-hour mark as the registering-ring 48' is manually rotated.

The registering-plate or marker 148 is fixedly mounted on the inside inclined surface of the registering-ring 48' in alignment with a boss of one of said spring-strips 57, causing an alignment of the point of the triangular marker 148 with the points of the hour triangular marks 149, the half-hour graduation marks 152, and the quarter-hour graduation lines 151 when the registering-ring 48' is rotated, as may be noted in Fig. 1. In this manner, an automatic alignment is effected when the registering-ring 48' is brought into operation relative to the hour graduation marks 149 and the half-hour and quarter-hour graduation marks, 152 and 151, respectively, on the dial-disc 44, and thereby affording maximum facility for registering of time, points or scores which will hereinafter be explained. As shown in Fig. 18, there is one of these inwardly tapered or cone-shaped depressions or recesses 59 to correspond with each quarter-hour mark, as well as each triangular hour-mark, on the dial, in order to adapt the time register for a golf score register or general score register which will be explained as the description progresses. I have illustrated in Fig. 14 two spring-strips placed diametrically opposite on the undersurface of the registering-ring 48'; however, only one may be found necessary to resist undue rotative movement.

The registering plate or graduation marker 148 which is mounted on the inclined or dished inside surface of the registering-ring 48', so as to lie beneath the crystal 47, is of triangular form and conforms in size and shape to the triangular graduation marks 149 which are displayed on the dial-disc 44 to serve as hour-marks, one of these triangular graduation marks 149 being opposite each of the hour numerals 150 which are arranged on the dial-disc 44 in circular formation.

The quarter-hours are indicated in the graduations by the thin straight lines 151, and the half-hours by the heavy straight lines 152. Between the numerals 11 and 12 I have provided three heavy straight-line elongated markers 153 and on the circular graduation lines, centrally located thereon, a zero mark is positioned opposite the numeral 12.

The dial-disc 44 is used for indicating or registering a specified time, so that, as a stationary time register, it may serve as a reminder of engagements, since it is in juxtaposition to the watch dial, or an accurate-to-the-minute register of time or record of specific time for the starting of work, trips, sports, motoring, boating, flying, games, contests and the like; or timing of all such diverse events, actions and engagements as is deemed desirable, and which come within the wide scope of the time register's practical and novel utility, by the possession of a combination wrist watch of this class which has a singularly handy and ideal time register supplementing the timepiece; and as a golf score register and general score register. And, as a new multi-feature automobile strap watch, the time register for recording the starting time of automobile trips especially, combined with the auto key feature, provides a wrist watch model of superior appeal and usefulness to motorists.

By moving the pointer 56, which is effected by a rotation of the gripping-wings 55 of the turning-knob which rotates the hub 49, the pointer 56 may be brought to rest at any position relative to the dial-disc 44, thus indicating by the hour, by the half-hour, and by the quarter-hour the time desired to be recorded. The rotatable registering-ring or dial-ring 48' co-operates in registering any accurate time to be registered, as it supplies additional minutes added on the quarter-hour.

For instance, if one desires to register the time 2:35, for any one of the reasons specified above, the pointer 56 would be moved until it rested at the graduation indicating 2:30, and the dial-ring 48' would be rotated until the registering-mark 148 rested at the numeral 5, thus indicating that the time registered was 2:30 plus 5 minutes, or 2:35. Were the time desired to be registered 4:56, the pointer 56 would be rotated to the three-quarter-hour mark indicating 4:45, and the ring 48' turned until the registering member or marker 148 automatically clicked into registration with the numeral 11. Were the time desired to be registered 2:18, the pointer 56 would be rotated to the quarter-hour mark indicating 2:15, and the ring 48' turned to effect registration with the numeral 3.

The numerals on the dial-disc 44, in such instance, when co-operating with the ring 48', indicate minutes, and since there are but twelve numerals on the dial 44, and the numeral 12 is neutral, it therefore becomes necessary, in order to register some such time as 2:57, 2:58 or 2:59, that there be three additional graduations, and these are the elongated graduations 153. In order to register the time 2:59, the pointer 56 would be moved to the graduation indicating 2:45, and the ring 48' would be turned until the marked 148 registered with the graduation 153 next to the numeral 12. Therefore, when the graduations 153 are used for registering a specified time, the time registered is the number of minutes indicated by the graduations 153, plus the 45 minutes designated by the pointer 56, plus 11 minutes. However, in actual practice, this mental addition is entirely unnecessary, because, after two or three times practice, in order to register the three times just mentioned, the method becomes obviously simple and merely requires moving the marker 148 backward toward the numeral 11 one, two or three points. That is, to register some such time as 2:57, 2:58 or 2:59, after only bare acquaintance with the time register, the method becomes automatic and entirely simplified by merely moving the pointer 56 to a three-quarter-hour graduation and the marker 148 backward from the numeral 12, since one point therefrom indicates 59, two points 58 and three points 57 minutes.

When it is desired to register an appointment at a certain hour on the hour, the pointer 56 would then be turned to indicate the major hour, and the ring 48' would be turned so that the marker 148 would be opposite the numeral 12. For instance, if it is desired to register an engagement at 3 o'clock, the pointer 56 would be turned to indicate the hour 3, and the marker 148 would be moved into alignment with the numeral 12. The hour numeral 12 being neutral, for the ring register marker 148 only, the time therefore registered would be 3 o'clock. Displayed in alignment with the numeral 12, and centered on the circular graduation lines, is positioned a zero mark, indicating that the numeral 12 is neutral.

The outside, inclined surface of the registering-ring 48' is provided with an accent mark 148', consisting of a groove filled with enamel of a suitable color, which is in juxtaposition to the marker 148, as shown in Fig. 1 where the time registered is 1:31. The accent mark 148' outwardly co-operates, as a guide, with the inside triangular marker 148 for added facility to the wearer in registering time.

Despite the foregoing elaborate description of the time register's operation for recording specific time, it is obvious that, were the combination wrist watch actually and objectively at hand and being demonstrated, the time register's simplicity of operation would be astonishingly apparent and embodies an idea as simple and quick to grasp as that of the telephone dial system.

As a golf score register, the central pointer 56 and the ring marker 148 are used to register either "holes" or "strokes". In this case, one's own points, whether "holes" or "strokes", may be registered by the central pointer 56 and the opponent's points by the ring marker 148, or vice versa. For instance, the central pointer or 56 or marker 148 when positioned at 2 would register eight points, and the forty-eight separate one-quarter-hour spaces would allow of that number of points, whether "holes" or "strokes", to be recorded. As a golf score register, the two registering members, 56 and 148, functioning on the same graduations, offer obvious advantages; as, for instance, quickly ascertaining comparisons of points at a glance. Particularly as a handy assistant to the usual score card for recording temporary "strokes" for a given "hole", for two players, the time register is singularly adaptable and useful; in this case, constant score card marking of individual "strokes" for a given "hole" is eliminated, for here it is done "on the wrist" by one of the two players as they proceed. Thus, totals of "strokes" are transferred to the score card after the finish of each "hole", saving the fuss and bother caused by the necessity of constantly removing from pockets and handling the score card. However, as a golf score register, it is here presupposed that a sufficiently shock-proof movement is utilized for use by the combination wrist watch for this purpose.

Similarly, points or scores of an endless number of games of sport may be registered quickly, and by novel and handy manipulation, by use of the central pointer 56 and the ring marker 148.

Both the lower section 32 and the upper section 33 conform substantially in contour and size. As shown in Fig. 8, the lower section is bulged outwardly at both ends to form a pair of circular parts connected together. At opposite sides of one end of the lower section 32 are the upstanding arcuate flanges 60 which are elevated extensions of the lower flanges 60'; the latter extend continuously around the casing section 32 and blend into the knuckles 36; all of which flanges being overlapped by the side-forming flanges 61 of the upper section 33. Thus, besides providing perfect alignment of the sections, a sufficiently sound and dust-proof construction is provided when sections 32 and 33 are in closed and locked position. A portion of the wall 60', 60 of the lower section 32 is cut away at one end at 62 under the press-button 82, and the guide-flanges or ribs 63 project inwardly at opposite sides of the opening 62. These guide-flanges 63 serve to keep the spaces 79' and 80', in which the latch members 79 and 80 engage, from contact with the shank 89' of the auto key 89 when the upper section 33 is pressed to a closed position. The upstanding arcuate flanges 60 are thus elevated to provide a coin-guide construction which facilitates handy and quick deposit of a nickel 105 and a dime 110, the coin-guide flange being adapted in size for the former, the dime being deposited over, and supported by, the nickel 105.

The upper section 33, as shown in Figs. 2 and 3, is provided with a circular rib 154 forming the boundary of a circular opening in the member 33, and has on its undersurface a recess projecting radially outwardly from said circular opening. The round wrist watch movement 66 is provided with the outside dial and the movement seating 66' positioned underneath thereof, and these members of the movement 66 engage in the recess under the circular rib 154 of the upper section 33, and secure in a press-fit the movement in registration with the rib 154. As shown in Fig. 2, the watch dial-ring 64 is a stationary annular portion, which surrounds the circular opening bounded by the rib 154, and projects outwardly from the upper surface of the upper section 33, said upper section 33 being cut away at one point on its outer surface inwardly on the stationary annular portion or dial-ring 64 to accommodate the ring 48'.

A substantially round movement casing 67 is provided with a flat closed end, and is adapted to enclose the substantially round wrist watch movement 66 in a press-fit, allowing a small space or area between the bottom of the movement and the inside flat closed end of the movement casing 67 which is necessary for the functioning of the movement mechanism. It will be noted in Figs. 2 and 9 that the movement 66 and the movement casing 67 are correspondingly shaped at one point, referring to their relative inward position at the intersection of the dial-rings 48' and 64; the movement casing 67 is here flat at one point of its circumference to conform with the round movement 6, which has its block trimmed slightly and only to the extent of not harming the efficient functioning of the movement mechanism. The purpose of employing this movement and movement casing construction will be presented hereinafter.

Although the drawings show the walls of the cylindrical movement casing 67 of a thickness equal to the width of the peripheral flange 66' of the movement 66, said thickness of the walls of the movement casing 67 is variable and actually may be considerably greater, in view of the fact that the movement seating 66' of a round wrist watch movement of the particular size in question is very small and slight. These members, 66 and 67, mounted together in a press-fit are projected, also in a press-fit, into the circular opening bounded by the rib 154 of the upper section 33 which is cut away on its outer surface inwardly on the stationary annular portion or watch dial-ring 64; said members are also projected by means of a press-fit into the downwardly projecting annular flange 154' (with reference to Fig. 2) which embraces the circular rib 154 and is formed integral with the upper section 33. The annular flange 154', which provides a notch adjacent to the knuckle-shield 34 for reception of the stem 69 only of the movement 66, identically matches the movement casing 67 in general shape, overlaps the latter in a press-fit, and provides a re-inforced construction and protection against dust in keeping with sound principles of wrist watch construction.

Four downwardly projected flanges, with a set of two positioned on opposite sides and in spaced relation, are formed integral with the annular flange 154' and the upper section 33; and have circular recesses formed near their lower edges. These downwardly projected flanges, 155 and 156 on one side and 155' and 156' on the other, are slightly resilient and tend to spring inwardly and are adapted to engage the movement casing 67, which is provided with corresponding tits 215 in spaced relationship to the above-mentioned circular recesses, in a press-fit; and with these parts thus mounted, that is, with the tits 215 engaging said circular recesses, the face of the movement casing 67 and the outer surface of the flanges 155, 156, 155' and 156' terminate flush so as to form together a planal surface. The flanges 155, 156, 155' and 156' may be formed separately and not integral with the annular flange 154', and attached to the latter by any means of a more simplified nature; or, instead of four, one flange alone on opposite sides and in spaced relation may be substituted.

A channel 92' is formed between the flanges 155, 156, 155' and 156' and the outside circular walls of the upper section 33, providing a recess, not only for housing the engaging arms 92 of the opening spring, but also to accommodate the gripping-flanges 167 and 167" which are formed integral with and at opposite sides of the movement casing 67, as shown in Figs. 7 and 9. These gripping-flanges are placed diametrically opposite the movement casing's center, between the flanges 155 and 156 on the one side and between flanges 155' and 156' on the other side, and project a sufficient distance beyond the latters' side edges to permit a gripping edge whereby the movement casing 67 and the enclosed movement 66 may be removed, for repairs or replacement of said movement, by a suitable tool. The assembly of the wrist watch movement 66 and its protective casing 67 is effected by the engagement of the four tits 215 in the cone-shaped circular recesses of the flanges 155, 156, 155' and 156' by a proper pressing thereinto of the movement casing 67. The movement casing 67 is provided with the circular notch 157 to accommodate the stem 69, whereas the sleeve 68 terminates against the annular flange 154' to provide added protection against dust by covering the notch of the latter which engages the stem 69.

The movement casing 67 and the enclosed movement 66, together with the stem 69, the sleeve 68 and the attached crown 70, may all be removed bodily and together upon a disconnection of the sections 32 and 33 by removal of the pintle 39 from the knuckles 36, 37 and 38; immediately prior to removal of the retarding-spring 73, which is simply removed from its operative channel by the fingers. This removal of the movement 66 and related members requires no more time than that which is required to remove a movement from the average wrist watch case. Said removal is permitted by the notch embracing the central portion of the end wall or neck 40, as shown in Figs. 9, 11 and 18. It is cut upwardly thereon and terminates circularly to form a housing for the stem 69 and sleeve 68, and when so mounted is concealed from view by the crown 70. When the removal of these members takes place, for repairs to the movement, the opening spring together with its spring-coils 90 and 91, because of its snugly-fitted spring-arms 93 mounted in the undercut grooves previously described, remains in operative position and alignment in the lower section 32 for re-assembling the sections together again. This is handily and quickly done by manually pressing the sections together, compressing all four spring-arms, so that the knuckles conform in position and alingment for reception of the pintle 39, which is easily projected through these members, in a press-fit, by means of a suitable tool.

The crown 70 of the wrist watch movement 66 projects above the elevated shield 83" a slight distance only, to permit it being gripped by the thumb or thumb-nail for forcing outwardly to move the stem axially, allowing the watch to be set at the proper time; and, as shown in Figs. 2 and 22, the crown's lower edge is also free to permit a sufficient grip by the tip of the fore-finger or fore-finger nail to assist the thumb. The crown 70, which is curved to conform to the curvature of the outside surface of the elevated shield 83", swings, when the upper section opens, downwardly axially in conjunction with the pintle 39 and assumes the exact position, which is illustrated by means of dotted lines, as shown in Fig. 22. Therein, it will be seen that the upper section 33 opens to an angle somewhat less than 90 degrees, allowing perfect access to the lower section 32 for removal of the auto key 89 and the coins 105 and 110. Observe that the crown 70 comes to rest adjacent to the strap 85, and in no way causing an objectionable contact of these members; also that the crown 70 does not come into direct contact with the wrist.

As illustrated in Fig. 11, the neck 40 is doubled upon itself at 71 and 72, to provide a channel or space 40' in which a cushion-spring or retarding-spring 73 may engage and slidably operate. The tapered and inwardly curved prong-like ends 73' engage on their curved outer sides against the inside perpendicular wall of the neck 40, as shown in Figs. 9 and 18. The retarding-spring 73 assumes centrally a downwardly-directed bow-shaped form. The tapered prong-like ends 73', unlike the central portion of the spring, are horizontal on their upper and lower parallel surfaces 73'', and slidably engage in a snug fit between the lower portions 71 and 72 and their correspondingly parallel upper surfaces of the channel 40'; hence, the upper and lower tightly-fitted parallel surfaces 73'' retain the ends of the spring 73 in a perpendicular position when the central bow-shaped portion is bent backward into the channel 40', as shown in Fig. 9, that is provided by the square bow-shaped portion of the spring 73 being half the width of the prong-like ends 73'. Upon release of the upper section 33 from its closed position the flat slanting undersurface of a boss 74 on spring 73 swings on an arc and comes forcefully into contact with the shoulder 77 on the lower section 32. It will be noted in Figs. 2, 21 and 22 that the shoulder 77 is provided with a slightly recessed formation 74'', into which the inside lower edge 74' of the bow-shaped portion of the retarding-spring 73 forcefully contacts, thus preventing downward slipping of the latter member from shoulder 77.

The tapered boss 74 referred to above is provided on the inside perpendicular side surface of the central bowed portion of the retarding-spring 73 and forms an integral part thereof. Fig. 17, which illustrates the reverse side from that which is shown in Fig. 16, illustrates the boss 74 wedge-shaped in cross section and having one face longer than the other, the inclination of the shorter face being more acute than that of the longer face. As the boss 74 is carried around the knuckle, it will move into registration with the recess 76 and snap therein to prevent the rebound hereinafter referred to and perform the function hereinafter mentioned. By being tapered, its disengagement from the recess may be effected upon a slight pressure, so that this boss, engaging in the recess, serves the function of resistably retaining the case sections in fixed position. This is the reason for the variance of the angularity of the longer and shorter faces of the wedge-shaped boss. This facilitates its disengagement from the recess 76, which will now be explained. As shown in Figs. 2 and 22, it lies in operative position adjacent to the curved knuckle-shield 34.

The forceful contact of the lower flat side of the spring 73 against the shoulder 77 of the lower casing member 32 (see Fig. 22), when the upper section 33 is released to open position, causes an immediate rebounding action which is partially prevented by the boss 74 snapping into engagement with the recess 76. The groove 75, formed in the central portion of the knuckle-shield 34, is of a less depth approaching the recess 76, so that the tapered boss 74, together with the spring 73, is bent backward into the space 40''; and reaching the recess 76, and registering with same, snaps immediately thereinto. In this manner and by this action, the upper section 33 is fixedly held in position and at a predetermined angle to permit access to the compartments of the lower section 32; that is, fixedly to an extent necessary to prevent undue excessive opening, oscillating or swinging on its axis. Fig. 22 illustrates, by means of the broken line projecting upwardly from the center of the pintle 39, the angle at which the upper section 33 opens; which is deemed sufficient to allow convenient access, although this angle may be modified in either direction.

When the upper section 33 is moved toward closed position relatively to section 32, the closing force applied by the fore-finger on the turning-knob or shield 83'' of the upper section automatically forces the boss 74, because of its peculiar tapered shape and because of the spring 73 of which it is a part as heretofore described by reference to Fig. 17, out of the recess 76, forcing same backward from the knuckle-shield into the space 40'' and bending spring 73, until the boss reaches the upper portion of the groove 75, which is deeper, at which point it resumes its normal position and the spring 73 resumes its straight lineal form.

In Figs. 11, 16 and 17 I have illustrated flat faced upwardly-projected top surfaces on the prong-like ends 73' of the retarding-spring 73, which are an integral part thereof. These upwardly-projected ends 73' are adapted to slidably engage in the sharp cornered upwardly-projected ends of the recess 40', which provides a limited slidable engagement only of these spring ends 73', both inwardly and outwardly. The ends, thus formed and mounted, resist downward pull caused on the spring 73 when its boss 74 is disengaging from the recess 76, as the section 33 is forced to closed position.

As illustrated in Figs. 11 and 18, the spring 73 is inserted in its operative channel 40' from the inward side of the neck 40, and its prong-like ends 73', of which the tips are cut with flat faces, serve to anchor the spring and retain its ends laterally in proper operative alignment, permitting its central bowed portion to be bent backwardly or inwardly to an extent equal to the width of the boss 74. In Fig. 8, I have illustrated the outside curved knuckle-shield 34, which in itself is thin, provided with the inwardly-projected or recessed groove 75. As shown in Fig. 21, the groove 75 accommodates the boss 74 also at its most shallow point, so that the inside surface of the flat faced spring 73 may rest and slidably operate against the curved outside surface of the knuckle-shield 34. Hence, since the retarding-spring 73 slidably engages the knuckle-shield 34, both in action and when at rest, and is held securely in correct operative position in its channel 40' by virtue of its tapered prong-like ends 73', it will be observed that no form of fastening for its ends is needed whatsoever, and that the mounting of this member into the upper section 33 during manufacture is effected both simply and quickly by its manual projection from the inward side of the channel 40'.

A latch-plate 78, as illustrated in Fig. 5, is provided with a pair of latch-arms 79 and 80 and is structurally combined with a spring 419. The spring 419, which is straight when unmounted, is of the same thickness as the latch-plate 78, and has provided at its outer ends the upwardly-projected portions 419' which serve to mount the combined latch-plate and spring in the grooves 420 and 421 positioned on the bottom surface of section 33, as shown in Fig. 9. The upwardly-projected portions 419' are mainly provided for the purpose of effecting a neat, dove-tail construction whereby these members and the bottom surface of section 33 are on the same plane. It will be noted in Fig. 5 that the latch-plate 78 and the spring 419 provide, in conjunction with each other, a slit construction which terminates inwardly and at a safe distance from the rectangular opening 78'. The latch-arms 79 and 80 are provided with sufficiently wide latches, which taper inwardly at an angle to conform with the rounded contour of sections 32 and 33; said latches straddling the shank 89' of the auto key 89, when the sections 32 and 33 are in closed position, engaging behind the flanges 79" and 80" of the lower section and thus serving to latch the two sections in closed position. The latches, together with their corresponding flanges 79" and 80", as shown in Figs. 8 and 9 by means of dotted lines, are provided ample depth or gripping-edge to supply safe and dependable locking of the sections; a provision, embodying balanced latching which will furnish ample security against accidental opening of the sections 32 and 33 when mounted on the wearer's wrist.

In Fig. 12, I have illustrated a modified form of combined latch-plate 78 and spring 419, wherein the downwardly-projected portions 419', together with the spring 419" only, are considerably thicker than the latch-plate itself; and these downwardly-projected portions 419' are mounted, likewise on the same plane with the bottom surface of section 33, in the grooves 420' and 421' which are correspondingly wider for their reception. Both forms of combined latch-plate and spring, as illustrated in Figs. 5 and 12, are provided with a tapered edge adjacent to the rectangular opening 78' which conforms, when these combined members are mounted in the upper section, to the inside curved surface of the end surface 33' positioned adjacent to the elevated shield 83"; said construction being illustrated by dotted lines in Fig. 2. The modified form of thickened spring 419" may be utilized to permit a maximum or greater downward curvature of the downwardly-curved end surface 33', which may prove efficacious relative to design; and which greater downward curvature would not be permitted by the thinner form of spring 419 shown in Fig. 5, as same would possibly thereby prove too light in weight, strength and resiliency. However, either form of combined latch-plate and spring may be employed and found advantageous.

A press-button 82 is provided with a rectangularly-shaped pin 81, the latter being projected through the side wall of section 33 and terminating in a pin-extension 82'. This pin-extension 82', which is approximately one-half the thickness of the pin 82 and which embodies its upper portion, is fixedly secured to latch plate 78 and provides a lower offset edge which abuts against the latch-plate 78 and allows the pin-extension to project inwardly of section 33 considerably beyond said latch-plate. This offset formation provides maximum strength and rigidity relative to the pin 82 and the combined latch members fixedly secured to same.

The press-button 82, which is shown in Figs. 1, 2 and 9, conforms in thickness, breadth and general shape and design to the crown 70; however, the former is necessarily rectangular in shape to conform with the general design of the entire structure and has rounded corners, and edges which are knurled on the top and sides to conform in appearance as far as possible to the knurled crown 70. The press-button 82 is provided with a horizontal groove of sufficient depth to supply the tip of the thumb or thumb-nail efficient gripping means whereby pressure can be exerted inwardly on the press-button to effect an opening of the sections 32 and 33. When the combination wrist watch is mounted on the wrist, ideal facility for this manual operation is provided by the inward position of the press-button 82 which is in direct line with the thumb of the right hand. As shown in Fig. 9, the inward side of the press-button 82 is not curved but flat, permitting a greater latitude of backward projection; which may also be given the inward side of the crown 70, although not shown in the drawings, and which would supply more space for a gripping edge by the fore-finger, assisting the thumb, to move the stem 68 outwards axially for setting the watch at the proper time.

An automatic action is provided whereby the nickel 105 and dime 110, when manually deposited within the coin-guide flanges 60 of the lower section, and the upper section is forced to closed position, are forced into said upper section 33 and securely held suspended therein by the related co-operation of three supporting members integral with the upper section. As shown in Figs. 7, 9 and 26, the movement casing 67 is provided with a small, bulged resilient area 25, against which the slightly round or beveled edge of the nickel 105 slidably contacts when the upper section 33 is brought to closed position; causing the bulged area 25 to be bent inwardly or backwardly to only the limited distance prescribed by the lower, flattened edge of the movement casing 67. This bulged area 25 projects outwardly to the extent only of being a completion of the full rounded circumference of the movement casing; hence, due to said limited backward pressure, the mechanical functioning of the movement 66 remains intact and in no way endangered. As the perpendicular round wall of the movement casing 67 is thin, the resiliency of the bulged area 25 can easily be provided; whereas the bottom surface can be very slightly thicker and non-resilient in its construction.

The other two coin supporting members comprise the downwardly-projecting wedging members 20 and 21, integral with the casing of section 33 and in spaced relation, and are illustrated in Figs. 9 and 27; these are tapered and latch-shaped, and provide a slight gripping edge which conforms to the rounded bevel of a nickel 105. The wedging members 20 and 21 are of course not resilient, as is the one at the opposite side which has already been described. When section 33 is forcibly brought to closed position, the deposited nickel 105 (and dime 110, supported by said nickel) is slightly shunted toward the movement casing 67, wedged upwardly, and engaged within the latch-like gripping-edges of the wedging members 20 and 21; while, at the same time, being wedged upwardly at the inward end against the resilient bulged area 25 of the movement casing 67; a wedging action in which, of course, the coin guide-flanges 60 contribute and co-operate. Thus, the coins, which are initially deposited over the shank 89' of the auto key 89, are automatically transferred to the upper section 33 and therein held securely suspended. In this action a slight latitude of backward movement is allowed the nickel 105, under said gripping-edges, as illustrated in Fig. 9 by means of dotted lines encompassed by the nickel 105. This is permitted by the diameter of a nickel being slightly less than that which is provided by the spaced coin guide-flanges 60, which engage said coin; the backward movement of the nickel 105, behind the gripping-edges of the supporting members 20 and 21, being caused by the bulged area 25 of the movement casing becoming released from backward compression as the nickel 105 is wedged upward'y and becomes clear of the outwardly-tapering side surfaces of the wedging members 20 and 21. This action is well illustrated in Figs. 8, 9, 26 and 27.

The press-button 82 provides a double-action feature designed to supply unobstructed removal for the auto key 89, whereby the key can be removed smartly, speedily and with utmost facility without the wearer being obliged to handle the coins at the same time; and procuring the auto key, alone, and in a handy manner, by flipping the key's shank 89' upwardly by the tip of the thumb which enables the wearer to quickly grasp the key for its removal. Fig. 23 shows the relative position of the pin-extension 82' with respect to the top surface and edge of the nickel 105, which contacts the pin-extension's lower flat surface when the sections 32 and 33 are in normally closed and locked position. Therein, it will be noted that inward pressure exerted on the press-button 82 does not normally affect the suspended and locked coins in section 33; and therefore, by ordinary straight inward pressure, the upper section 33 will tend to open as soon as the latches are clear due to the strong opening force of the double-coil opening spring, without dislodging said coins 105 and 110.

It will be observed, as illustrated in Figs. 23, 24 and 25, that a small amount of space for clearance for the press-button pin 81 is provided in the end wall of section 33, through which the pin projects; and that an equivalent amount of space for clearance is provided the top horizontal edge of the press-button 82 relatively to the overhanging ledge of the elevated shield 83'' which protects the press-button. This construction permits these members, together with the spring 419 or 419'', to be tipped upwardly by upward pressure applied by the thumb on the press-button; which action at the same time slightly flexes the latch spring, causing the pin-extension 82' to be pressed downwardly upon the top outside edge of the nickel 105. As shown in Fig. 25, this downward pressure of the pin-extension 82' dislodges the nickel 105 from its suspended and locked position within the gripping-edges of the two supporting members 20 and 21, releasing both coins simultaneously upon opening the upper section 33 to their original position as deposited within the coin guide-flanges 60. Therefore, by this combined mechanical action and manual operation, the opening of the upper section 33 and simultaneous release of said coins to the lower section 32 is effected by the simple application of full pressure combined with upward force exerted in the groove of the press-button 82; and allowing the coins to both be easily picked out of the coin-guide flange for use. Note that a proper shape and construction is provided the spring 419, in Fig. 5, and 419'', as shown in Fig. 12, to permit the flexing necessary to this mechanical action; which, coupled with the employment of steel of a proper strength and resiliency, combine to render both action and construction efficient and durable and in no way whatsoever harming the latch members and their dependable functioning. Also a proper horizontal top surface is provided the elevated shield 83'' adjacent the press-button 82 to assist the wearer to handily exert said upward pressure in the groove of the press-button, whereby, with the tip of the forefinger positioned on the elevated shield to co-operate with thumb pressure, a pinching or squeezing together of said fingers relatively to these members affords ideal facility for this manual operation.

As illustrated in Figs. 4 and 8, the coin guide-flanges 60 are provided with beveled edges and downwardly-curved ends, adjacent the latch spaces 79' and 80'; said coin guide-flanges being sufficiently elevated to permit safe deposit of coins, pending the closing of the upper section 33, without accidental slipping away.

In Fig. 19 I have illustrated the code-marked auto key 89, having a size and general shape adapted for reception in the compartments of the lower section 32. Approximately five master key blanks only are necessary to service the key feature, and these are interchangeably provided to suit the requirements of each individual wearer by the retailer. The auto key blank, as shown in Fig. 19, illustrates a standard form and design provided for the bow or head of the auto key 89; said bow or head remains the same width in all master blanks, and the shoulders vary in length according to individual requirements relatively to the shank 89' which is slightly longer on some than on others; pattern of shank does not affect the auto key and coin features. An emblem, as shown, is embossed or engraved on the key head to accommodate the watch manufacturer's trade name.

It will be noted that, in Fig. 2, the inner face of the registering-ring 48' is beveled to form an inclined surface equal in width to that of the watch dial-ring 64, which has a greater space between the watch dial and its crystal 65. This permits the inwardly-inclined or dished inside surfaces of these dial-rings to appear equal and practically the same when viewed from the exterior of the wrist watch case as a whole, as illustrated in Fig. 1, coupled with the equalized height of the crystals 47 and 65. Hence, a sound double dial construction is perfected whereby these dissimilar depths appear the same, affording the advantage of the time register dial-disc 44 being positioned somewhat higher than the watch dial; occasioned by only one hand or pointer 56 being employed and mounted on the hub 49 approximately on a level with the registering-plate or marker 148; also the advantage of an improved view for registering purposes of the three elongated graduations 153, graduations, hour marks, hour numerals and the zero mark positioned at the hour numeral 12.

Coupled with the employment of other means, previously described, for effecting a condensation of structure and over-all length of the wrist watch case as a whole, the outside angular surface of the registering-ring 48' slidably engages with a corresponding undercut portion or formation which is provided the stationary annular watch dial-ring 46 at their point of juncture. This construction is shown in Figs. 1 and 2.

The combination wrist watch is secured to the wrist by the strap 85, preferably a leather strap of the standard ⅝ inch width. The lugs 18 and 19 are spaced to accommodate straps, or metal watch bracelets, of this width; and are shown in Figs. 2, 13, 8 and 22, being indicated in the latter two drawings by dotted lines. The strap lugs project downwardly at an outward angle sufficient to afford proper wearing comfort combined with a wrist watch case which is flat on its bottom surface, which contacts the wearer's wrist. The lugs, so positioned on a flat bottom surface, substantially provide, in effect, the same curvature common to the bottom surfaces of ordinary wrist watch cases; and provide a design which permits the flat undersurface to snugly (and advantageously, preventing to a greater degree endways slipping) engage the wrist, referring especially to the underneath central portion of the wrist watch case, when worn with the leather strap 85. This particular construction, relative to the underneath position of the strap lugs 18 and 19, is, in wearing effect, and compared with the average man's model, counter-balanced by the unusual rounded contour of the case's ends and their downwardly-curved surfaces 33', as shown in Fig. 1; and because of said rounded contours, the ends of the upper section 33, which project outwardly and slightly beyond the lugs 18 and 19 positioned underneath, are unobtrusive and sufficiently low-swung on the wrist for due comfort to the wearer. The lugs 18 and 19, which have rounded ends and beveled edges, provide a minimum downward projection due to the employment of threaded lug-pins for engaging the loops of the doubled-over straps 85. The lug-pins, which are provided with bolt-heads at one end, screw into correspondingly threaded holes in the lugs 19, the lug-holes of the lugs 18 not being threaded, as shown in Fig. 8. The common lug and pin construction, which dispenses with the thread on both members, may be substituted; or any other type of lug and pin construction may be employed.

It should be noted, by reference to Figs. 1, 2 and 8, that the lugs 18 and 19 (or lugs of any other type) may be positioned farther apart or extended outwardly to a greater extent than is shown in the drawings; which slight extension would not appreciably interfere with the design of the wrist watch case, due to the underneath and inconspicuous position of said lugs, nor to the axially downward swinging of the crown 70 relatively to the loop of the strap 85. For, as illustrated in Fig. 22, these members are greatly enlarged, referring particularly to the proximity of crown 70 (shown in dotted line) with the loop of the strap 85; and, should these lugs 18 and 19 be extended slightly, the strap loop adjacent to the knuckle-shield mechanism will, in view of the curvature of the average wrist, assume less of an outward projection and will therefore still provide the same approximate relationship of strap loop to crown 70 as shown in Fig. 22.

The ornamental projections 87 and 88 have an underneath flat surface, and project outwardly from the connection of the inwardly-curved lower side walls or side edges 70'', as shown in Fig. 3, with the upwardly and inwardly tapered side walls of section 33. The ornamental projections have upper surfaces which curve downwardly, in keeping with the end surface 33' and wing-projections 33''; and are provided with ornamental grooves filled with enamel of a suitable color, as also are the elevated shields 83''. Hence, these ornamental projections 87 and 88 lie comparatively close to the wearer's wrist and are amply protected by the marginal limits of the outwardly-curved side walls of section 33, and therefore will not catch on clothing or other external objects.

It will be noted that, by reference to Figs. 8, 9 10 and 18, the individual coils of the opening spring lie together in snug operative position relatively to each other, and, instead of showing an angle, extend at right angles to the pintle 89. This is therein shown accurately, being precisely a characteristic of this type of double-coil spring; and since the coils, 90 and 91, in operative action, scarcely unbend or occupy additional space, their employment is advantageous.

By reference to Figs. 9 and 18, it will be observed that, for a reduction of weight of the combination wrist watch case to a minimum, the flat surfaces comprising the bottom or underneath portions of the ornamental projections 87 and 88, the end surfaces 33' and the wing-projections 33'' may be trimmed inwardly thereof or gouged at their central portions.

As illustrated in Figs. 3 and 4, all edges of the lower section 32 which lie adjacent the wearer's wrist are provided with a suitable bevel, as also are, but to a less extent, all angular edges of the upper section 33; and thus contributing toward the complete wearing comfort which the combination wrist watch case affords.

While I have illustrated and described the preferred form of construction of my invention, I do not wish to limit myself to the precise details of construction shown, but desire to avail myself of such variations and modifications as may come within the scope of the appended claims.

Having thus described my invention, what I claim as new and desire to secure by Letters Patent is:

1. A combination wrist watch of the class described, comprising: a casing having a bottom section and a cover section; said bottom section comprising two substantially circular parts connected together and having a narrow central portion between formed by said circular parts overlapping each other; perpendicular side walls projecting upwardly of the periphery of said bottom section; a pair of strap or watch bracelet lugs in spaced relation on both the substantially circular parts and integral therewith, projecting outwardly from the reverse face or under side of said bottom section to engage straps or a watch bracelet for securing said section to the wrist; said cover section being swingably mounted on said section, and having substantially circular walls projecting downwardly of its periphery to overlap said walls of said bottom section in telescopic relation; a latch for engaging said cover section in closed relation to said bottom section, having separated latch members positioned at either side of the longitudinal center of said cover section; a spring at the pivoted end of said sections for normally swinging said cover section to open position upon manual release of said latch; a wrist watch movement carried by said cover section, unattached to said bottom section; a watch sleeve; a watch winding stem enclosed in said watch sleeve; and a watch crown mounted on said stem and projecting outwardly from said swingably mounted end of said casing sections; said sleeve terminating outwardly from the side surface of said movement to allow the innermost outer surface of said stem freedom from said enclosing sleeve.

2. In a combination wrist watch of the class described: a casing comprising a lower section and an upper section hingedly mounted together at one end; an annular member rotatably mounted on the outer surface of the upper section; a stationary annular portion projecting upwardly from the upper surface of said upper section and positioned adjacent said movable annular member, said section being cut away on its inner surface upwardly on said stationary annular portion; said upper section provided with a circular opening therein encompassed and surrounded by said stationary annular portion, and provided with a downwardly projected substantially annular flange outwardly of said substantially circular opening; said downwardly projected flange forming a substantially circular sleeve between its outer edge and the inner surface of the casing of said upper section; a substantially circular wrist watch movement provided with a dial of substantially circular shape, there being positioned below said member a substantially circular movement seating; said upper section and downwardly projected flange enclosing, in a press-fit, the peripheral edge of said dial of the movement and holding said dial in position in registration with said circular opening and immovable relatively to said upper section.

3. In a combination wrist watch of the class described: a casing having a lower section and an upper section hingedly mounted together at one end; an annular member rotatably mounted on the top surface of said upper section; a stationary annular portion projecting outwardly from the upper surface of the upper section adjacent said annular member; said stationary annular portion being nearest, and in proximity to, said hinged end; a circular opening formed within said stationary annular portion, the inner surface of said upper section being cut away around said opening outwardly thereof to provide a recess; said recess, although substantially circular, having a flattened side surface within its circumference and positioned in proximity to the juncture of said annular member and said annular portion; a downwardly projected peripheral flange on said stationary annular portion and in registration with said circular opening and corresponding in shape to said recess for framing said circular opening and said recess; a substantially round wrist watch movement having its peripheral side surface trimmed or flattened diametrically opposite its stem, and having a dial and upper movement seating of said movement which are identically shaped, to correspond with said recess; said upper section and downwardly projected peripheral flange enclosing, in a press-fit, the peripheral edge of said dial and upper movement seating at both circular and flattened points for securing the movement in position in registration with said circular opening and immovable relatively to said upper section; a substantially circular casing enclosing said wrist watch movement in a press-fit by having correspondingly shaped sides, and having a flat closed end with a small space between the lower surface of said movement and the inner face of said substantially circular casing to permit the mechanical functioning of said movement, said last named casing also having near its closed end pairs of spaced tits in spaced relation on opposite sides of said last named casing and between individual tits of each pair oppositely positioned gripping-flanges; said downwardly projected peripheral flange having correspondingly positioned resilient extensions provided with recesses for engaging said tits, said resilient extensions terminating at their ends on a plane with the bottom closed surface of said casing of said movement; said casing enclosing said movement mounted thereon in a press-fit, and projected into, in a press-fit, said downwardly projected peripheral flange with said tits engaging said recesses, and thus securely mounting said movement in operative position in registration with said circular opening and immovable relatively to said upper section.

4. In a combination wrist watch of the class described: a casing having a lower and an upper section; a stationary dial ring portion projecting outwardly from the outer surface of said upper section and integral therewith, said upper section having an opening formed therein and framed by said ring portion, the under surface of said section being recessed radially outwardly of said opening; a downwardly projecting flange on said upper section surrounding said opening and formed integral with said section, said flange being extended to provide a plurality of lugs, each of said lugs being provided on its inner face adjacent its lower edge, with a recess; a substantially around wrist watch movement, flattened at one point of its periphery; a substantially round enclosing casing, open at one end, of a shape similar to that of said watch movement, having a plurality of tits adjacent the periphery of the closed end and engageable in the recesses in said flange lugs for retaining said casing last named in enclosing position relatively to said wrist watch movement and in a press-fit relative to the recess in said upper section; and gripping flanges projecting outwardly from the periphery of said watch-enclosing casing adjacent its closed end, said gripping flanges being in spaced relation between said tits for affording a means for removing said casing from operative position.

5. In a combination wrist watch of the class described: a casing having a lower section and an upper section hingedly connected together at one of its ends; a stationary annular portion projecting outwardly from the outer face of the upper section, said upper section having a circular opening formed therein within said annular portion, the inner surface of said upper section being cut away around said opening radially outwardly thereof to provide a recess; a substantially circular wrist watch movement; a substantially cylindrical casing, open at one end, enclosing said movement and mounted thereon in a press-fit, and projected into, in a press-fit, said recess; a downwardly projected flange on said upper section formed integral therewith and extending around said casing, said flange having spaced recesses formed near its lower edge; said substantially cylindrical casing having near its closed end pairs of correspondingly spaced tits, said pairs being oppositely placed on the last named casing; a gripping-flange positioned on said last named casing between individual tits of each pair; said downwardly projected flange having flange projections integral therewith and bearing said spaced recesses; said substantially cylindrical casing having its spaced tits engaged in operative position within said spaced recesses of said flange projections; the lower edges of said flange projections terminating downwardly on the same plane with the bottom surface of said substantially cylindrical casing; said gripping-flanges affording a means for removing said substantially cylindrical casing from operative position.

6. In a combination wrist watch of the class described: a casing having upper and lower sections hingedly mounted together; said upper section having a stationary dial ring portion and a movable dial ring provided on said upper section; latching means mounted on said upper section and engageable with said lower section; a circular opening formed within said stationary dial ring portion; a substantially circular recess formed within said stationary dial ring portion and within said upper section; a substantially circular wrist watch movement; a substantially cylindrical casing with a flat closed end enclosing said watch movement; a downwardly projected flange, bearing spaced projections having recesses, surrounding said substantially cylindrical casing and formed integral with said upper section; said substantially cylindrical casing bearing spaced tits and having outwardly projected gripping flanges positioned therebetween; said recesses engaging said tits; said gripping flanges being exposed when said upper and lower sections are unlatched and in open position to permit said substantially cylindrical casing to be disengaged from said downwardly projected recess-bearing spaced projections; said exposed gripping flanges being positioned on opposite sides of said last named casing to allow even pressure to be exerted thereon for forcing outwardly said last named casing from operative position.

7. In a combination wrist watch of the class described: a casing having a lower and an upper section; a stationary dial ring portion and a rotatable dial ring in juxtaposition projecting outwardly from the upper surface of said upper section, the stationary dial ring portion only being integral with said upper section; said stationary dial ring portion having a circular opening formed coaxially therein, the under surface of said upper section being recessed radially outwardly of said opening and provided with a downwardly projecting peripheral flange downwardly of said circular opening; said downwardly projecting flange, although substantially circular, being flattened at one point, and having an upwardly directed notch formed in its circular portion; a substantially round wrist watch movement, flattened on its sides and edge at one point; and a substantially round casing enclosing said wrist watch movement and being, likewise flattened to the same extent at one point, having a flat closed end and a substantially circular side wall; said substantially circular side wall having a notch therein to engage the winding stem of said movement, the notch being diametrically opposite said flattened portion; said circular wall of said casing providing thereon at one point of its outside periphery a bulged area resiliently constructed; an outwardly projecting neck adjacent said stationary dial ring portion and integral with the upper section; said neck having an upwardly directed notch therein of greater width and depth than that of said notch of said downwardly projecting flange; said substantially round casing and said wrist watch movement being mounted together in a press-fit, and projected into, in a press-fit, said downwardly projecting flange; said winding stem engaging in said notches of the flange and last named casing; a crown mounted on one end of said stem, a sleeve attached to said watch crown enclosing said winding stem and mounted on said movement; said sleeve housing the stem and engaging in the notch of said neck, and terminating inwardly against, and in close relationship to, the outer substantially circular side wall of said downwardly projecting flange and enclosing or straddling the outer portion of the notch of said flange to effect a sufficiently dust-proof construction of said members.

HOWARD A. KEHL.